(12) United States Patent
Wu et al.

(10) Patent No.: US 11,451,562 B2
(45) Date of Patent: Sep. 20, 2022

(54) RECOMMENDING SIGNALS TO MONITOR IN A FRAUD PREVENTION APPLICATION

(71) Applicant: MASTERCARD TECHNOLOGIES CANADA ULC, Vancouver (CA)

(72) Inventors: Hanhan Wu, Surrey (CA); Nicholas Desmond, Vancouver (CA); Karen Rose Taylor, Vancouver (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 314 days.

(21) Appl. No.: 16/864,470

(22) Filed: May 1, 2020

(65) Prior Publication Data
US 2021/0344688 A1 Nov. 4, 2021

(51) Int. Cl.
G06F 17/15 (2006.01)
G06K 9/62 (2022.01)
H04L 9/40 (2022.01)

(52) U.S. Cl.
CPC .......... *H04L 63/1416* (2013.01); *G06F 17/15* (2013.01); *G06K 9/6215* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 2007/0106582 A1* | 5/2007 | Baker | ................ | G06Q 30/0185 705/35 |
| 2010/0228656 A1* | 9/2010 | Wasserblat | ............. | G06Q 40/00 705/35 |
| 2013/0298230 A1* | 11/2013 | Kumar | ................ | H04L 63/1441 726/22 |
| 2015/0026027 A1* | 1/2015 | Priess | ................ | G06Q 20/4016 705/35 |
| 2016/0005029 A1* | 1/2016 | Ivey | .................... | G06Q 20/4016 705/44 |
| 2018/0191762 A1 | 7/2018 | Bailey et al. | | |
| 2018/0262511 A1* | 9/2018 | Guo | .................... | G06Q 20/3224 |

OTHER PUBLICATIONS

International Search Report and Written Opinion for Application No. PCT/CA2021/050532 dated Jul. 14, 2021 (12 pages).

* cited by examiner

*Primary Examiner* — Mohamed Ibrahim
(74) *Attorney, Agent, or Firm* — Michael Best & Friedrich LLP

(57) ABSTRACT

A system, method and computer-readable medium for recommending signals to monitor in a fraud prevention application, including a server including an electronic processor. The electronic processor is configured to calculate a similarity score for one or more clients, and, for one or more signals, determine, for each of the one or more clients, a signal weight associated with the signal. The electronic processor is also configured to multiply the signal weight by the similarity score associated with the client to generate a weighted similarity score and generate a total similarity score and, for each signal, a total weighted similarity score. The electronic processor is configured to, for each signal, generate a recommendation score based on the total weighted similarity score for the signal and the total similarity score for the signal and, based on the recommendation scores, generate one or more recommended signals for a first client.

20 Claims, 6 Drawing Sheets

| | Similarity Score (S) | Signal 1 Weight (SW1) | S*SW1 | Signal 2 Weight (SW2) | S*SW2 | Signal 3 Weight (SW3) | S*SW3 |
|---|---|---|---|---|---|---|---|
| SECOND CLIENT | 0.91 | 13 | 11.83 | 5 | 4.55 | | |
| THIRD CLIENT | 0.87 | 5 | 4.35 | | | 3 | 2.61 |
| FOURTH CLIENT | 0.83 | 10 | 8.3 | 7 | 5.81 | 6 | 4.98 |
| FIFTH CLIENT | 0.64 | 2 | 1.28 | 6 | 3.84 | 10 | 6.4 |
| SIXTH CLIENT | 0.32 | 1 | 0.32 | 3 | 0.96 | 5 | 1.6 |
| total | | | 26.08 | | 15.16 | | 15.59 |
| sum_sim | | | 3.57 | | 2.7 | | 2.66 |
| recommendation score | | | (7.3) | | 5.6 | | 5.9 |

FIG. 4

RECOMMENDING SIGNALS TO MONITOR IN A FRAUD PREVENTION APPLICATION

BACKGROUND

Clients or organizations may subscribe to or purchase fraud prevention software (also described herein as a fraud prevention application or fraud prevention service) to prevent attackers from accessing the client's data, stealing information, stealing resources, and the like.

SUMMARY

Often when a client subscribes to or purchases a fraud prevention service the client must determine how they want to configure the fraud prevention service. As a part of the configuration of a fraud prevention service, a client may select one or more signals to be monitored by the fraud prevention service. A signal is a rule that is applied to a client's data to determine if an attack against the client has occurred or is in progress. A signal is triggered when abnormal behavior associated with the signal is recorded as occurring for the client. For example, the signal "Login Failure Ratio" may be triggered when a predetermined percentage of the logins recorded for the client in an hour are failed logins.

It may be difficult for a client to know which signals to select. Therefore, embodiments described herein provide a system and method for recommending signals for selection to the client. Recommended signals may be generated based on data associated with other similar clients that are subscribed to the fraud prevention application. For example, if clients, similar to the client which signal recommendations are being generated for, often experience the signal "Login Failure Ratio" being triggered, then the signal "Login Failure Ratio" may be recommended to the client.

One embodiment describes an example system for recommending signals to monitor in a fraud prevention application. The system includes a server including an electronic processor. The electronic processor is configured to receive a request for signal recommendations for a first client, calculate a similarity score for one or more clients different from the first client, and, for one or more signals, determine, for each of the one or more clients, a signal weight associated with the signal. The electronic processor is also configured to, multiply the signal weight by the similarity score associated with the client to generate a weighted similarity score associated with the signal and the client and generate a total similarity score and, for each signal, a total weighted similarity score. The electronic processor is further configured to, for each signal, generate a recommendation score based on the total weighted similarity score for the signal and the total similarity score for the signal and based on the recommendation scores, generate one or more recommended signals for the first client.

Another embodiment describes an example method for recommending signals to monitor in a fraud prevention application. The method includes receiving a request for signal recommendations for a first client, calculating a similarity score for one or more clients different from the first client, and, for one or more signals, determining, for each of the one or more clients, a signal weight associated with the signal. The method also includes multiplying the signal weight by the similarity score associated with the client to generate a weighted similarity score associated with the signal and the client and generating a total similarity score and, for each signal, a total weighted similarity score. The method further includes, for each signal, generating a recommendation score based on the total weighted similarity score for the signal and the total similarity score for the signal and, based on the recommendation scores, generating one or more recommended signals for the first client.

Yet another embodiment describes an example non-transitory computer-readable medium with computer-executable instructions stored thereon executed by an electronic processor included in a server to perform the method of recommending signals to monitor in a fraud prevention application. The method includes receiving a request for signal recommendations for a first client, calculating a similarity score for one or more clients different from the first client, and, for one or more signals, determining, for each of the one or more clients, a signal weight associated with the signal. The method also includes multiplying the signal weight by the similarity score associated with the client to generate a weighted similarity score associated with the signal and the client and generating a total similarity score and, for each signal, a total weighted similarity score. The method further includes, for each signal, generate a recommendation score based on the total weighted similarity score for the signal and the total similarity score for the signal and, based on the recommendation scores, generating one or more recommended signals for the first client.

BRIEF DESCRIPTION OF THE FIGURES

FIG. 4 is an example table of values calculated when the method included in FIG. 3 is executed according to some embodiments.

DETAILED DESCRIPTION OF THE EMBODIMENTS

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
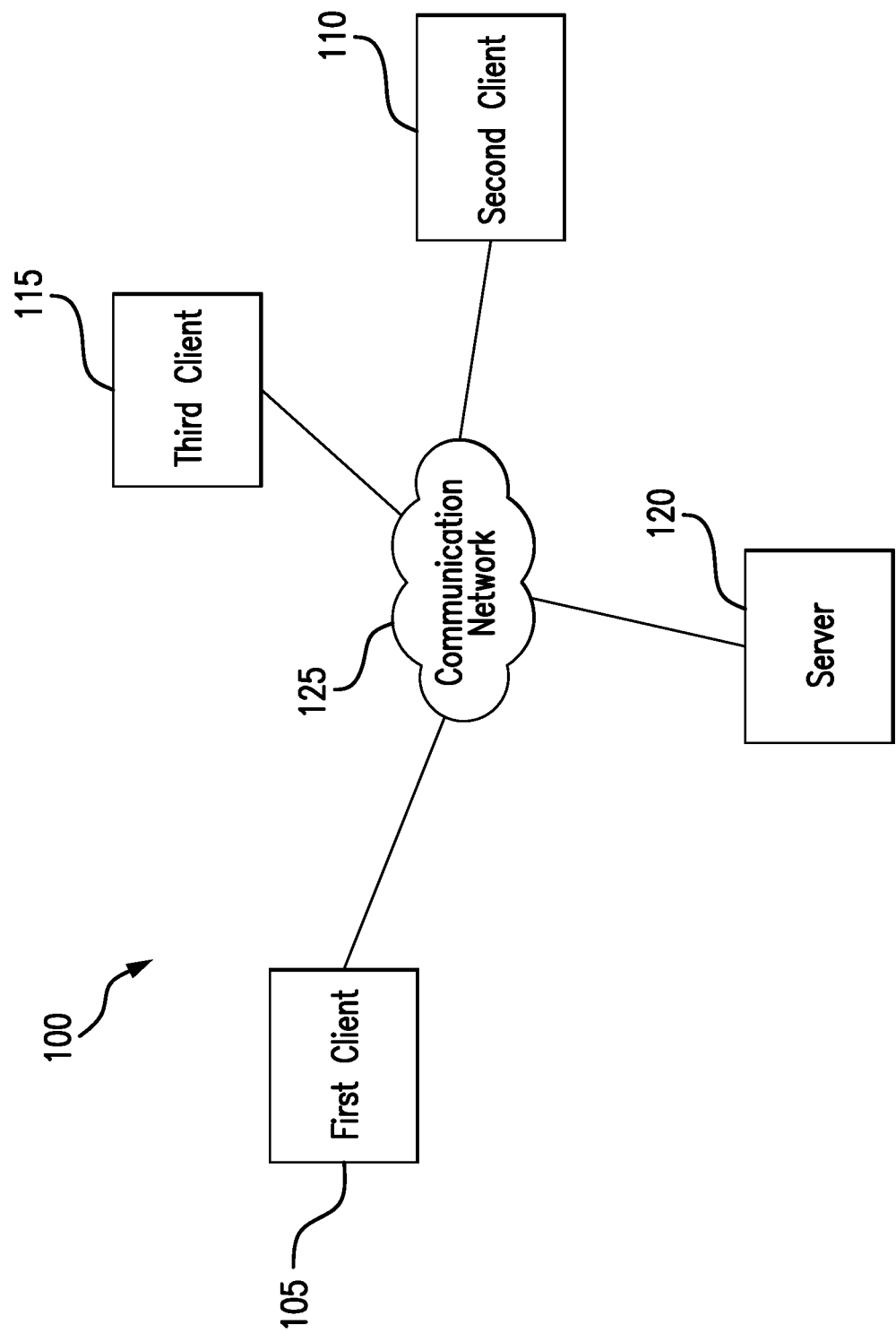
FIG. 1 is a block diagram of a system for recommending signals to monitor in a fraud prevention application in accordance with some embodiments.

FIG. 1 is a block diagram of a system 100 for controlling usage of electronically shared information. In the example shown, the system 100 includes a first client 105, a second client 110, a third client 115, and a server 120. The first client 105, second client 110, third client 115, and server 120 are communicatively coupled via a communication network 125. The communication network 125 is an electronic communications network including wireless and wired connections. The communication network 125 may be implemented using a variety of one or more networks including, but not limited to, a wide area network, for example, the Internet; a local area network, for example, a Wi-Fi network; or a near-field network, for example, a Bluetooth™ network. In some embodiments, the first client 105, the second client 110, and the third client 115 each include one or more electronic devices.

It should be understood that the system 100 may include a different number of clients and that the three clients included in FIG. 1 are purely for illustrative purposes. It should also be understood that the system 100 may include a different number of servers than the number of servers illustrated in FIG. 1 and the functionality described herein as being performed by the server 120 may be performed by a plurality of servers.

Figure 2:
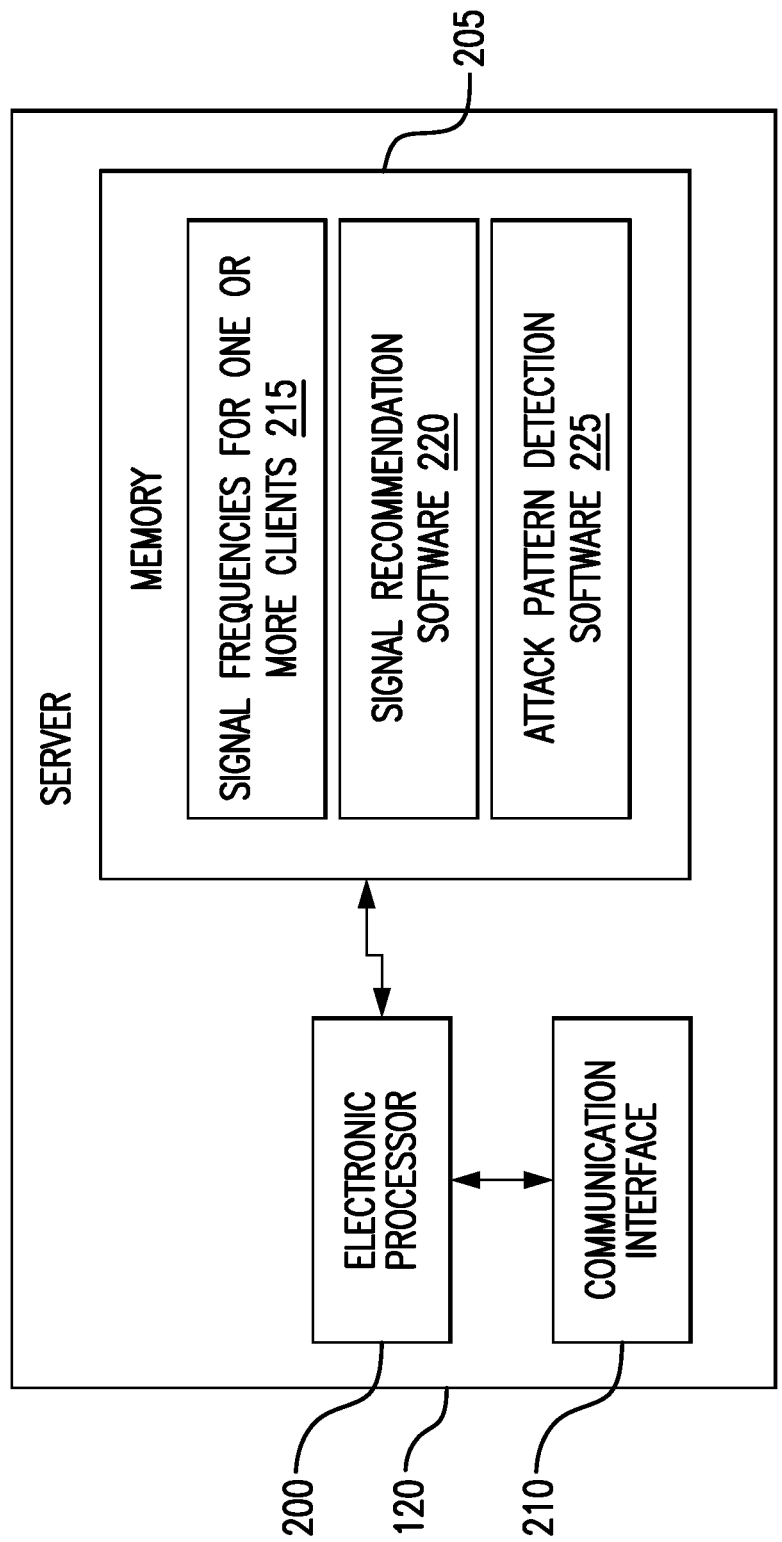
FIG. 2 is a block diagram of a server of the system of FIG. 1 in accordance with some embodiments.

FIG. 2 is a block diagram of an example of the server 120. As illustrated in FIG. 2, the server 120 includes an electronic processor 200 (for example, a microprocessor, application-specific integrated circuit (ASIC), or another suitable electronic device), a memory 205 (a non-transitory, computer-readable storage medium), and a communication interface 210, such as a transceiver, for communicating over the communication network(s) 125 and, optionally, one or more additional communication networks or connections. The communication interface 210 allows the server 120 to communicate with the first client 105, second client 110, and third client 115 over the communication network(s) 125.

In the embodiment illustrated in FIG. 2, the memory 205 included in the server 120 includes signal frequencies for one or more clients 215, signal recommendation software 220, and attack pattern detection software 225. The signal frequencies for one or more clients 215 includes, for each signal and client, a record of how often the signal is triggered for the client. When the electronic processor 200 executes the signal recommendation software 220, the electronic processor 200 performs the method 300 described below. When the electronic processor 200 executes the attack pattern detection software 225, the electronic processor 200 determines whether and what type of attack is taking place against a client based on the signals that are triggered for the client. In some embodiments, the memory 205 also includes feature data used in the generation of similarity scores as described below. It should be understood that the functionality described herein as being performed by the signal recommendation software 220 and attack pattern detection software 225 may be distributed among multiple applications or software components. Additionally, the signal recommendation software 220 and attack pattern detection software 225 may perform functionality other than that which is described herein.

Figure 3:
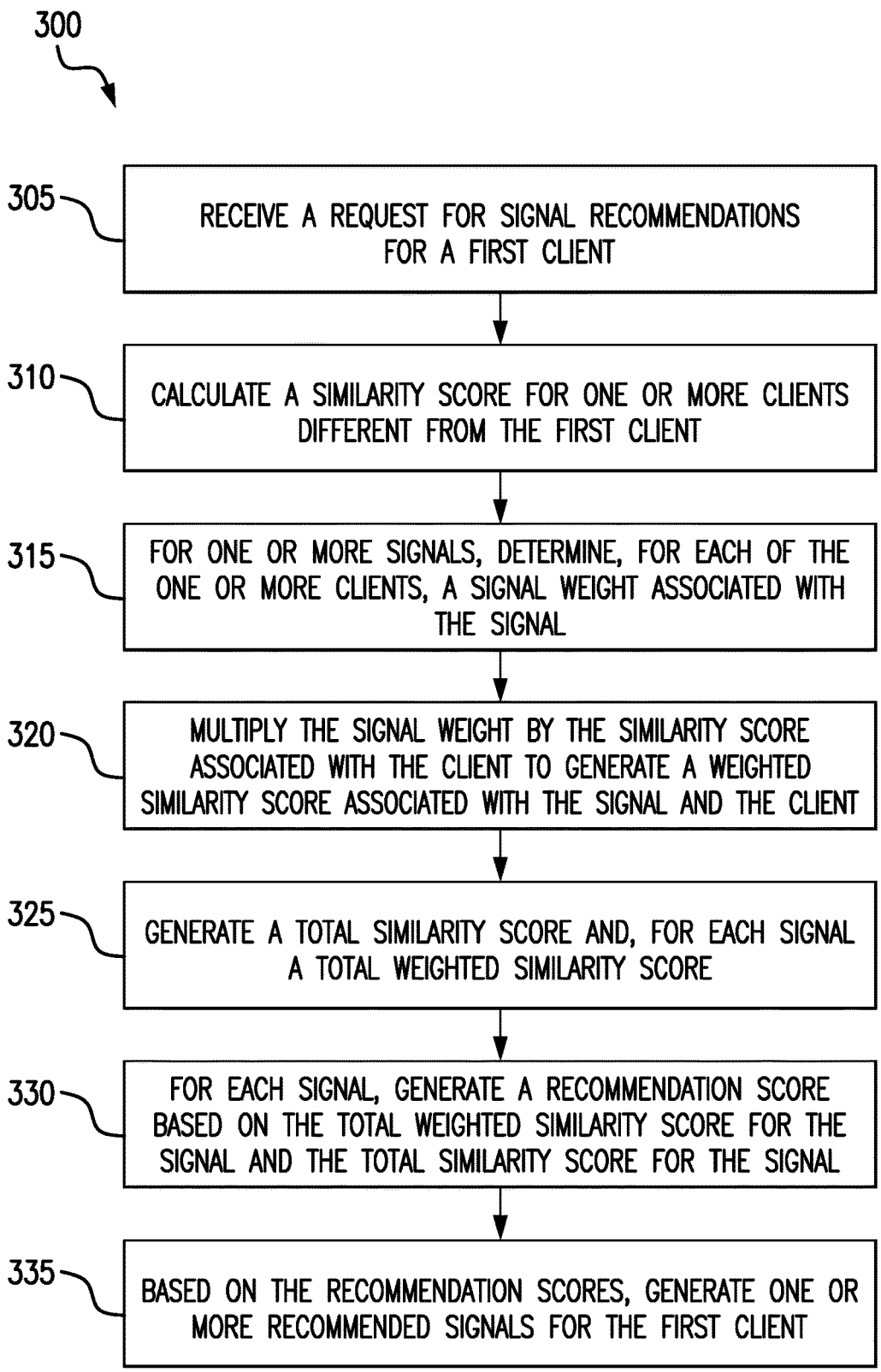
FIG. 3 is a flow chart of a method of recommending signals to monitor in a fraud prevention application in accordance with some embodiments.

FIG. 3 is an example flow chart illustrating a method 300 recommending signals to monitor in a fraud prevention application. In some embodiments, the method 300 begins at step 305 when the electronic processor 200 receives a request for signal recommendations for a first client (for example, the first client 105). The first client 105 may be a client that has recently subscribed to a fraud prevention service provided by the server 120 or a different server included in the system 100. At step 310, the electronic processor 200 calculates a similarity score for one or more clients different from the first client 105. The similarity score represents the similarity between the first client 105 and a different client included in the system 100. For example, the electronic processor 200 may generate a first similarity score between the first client 105 and the second client 110 and a second similarity score between the first client 105 and the third client 115. Each similarity score may be generated based on one or more features associated with the clients that the similarity score is associated with. In some embodiments, the features are traffic pattern features, biometrics behavior features, and geological behavior features. The below tables include examples of each traffic pattern features, biometrics behavior features, and geological behavior features.

Traffic Pattern Features Table

| Feature | Description of Feature | Calculation associated with Feature |
| --- | --- | --- |
| daily_attempts_mean_max | The ratio of the average number of attempts per day to the maximum number of attempts in a | daily_attempts_mean_max = (average daily number of activities + 1)/(max daily number of activities + 1) |

Traffic Pattern Features Table

| Feature | Description of Feature | Calculation associated with Feature |
|---|---|---|
| | day in a client. An attempt may be a login, a purchase activity, an online application behavior, and the like. | |
| daily_attempts_median_max | The ratio of median number of attempts per day to the maximum number of attempts in a day in a client. An attempt may be a login, a purchase activity, an online application behavior, and the like. | daily_attempts_median_max = (median daily number of activities + 1)/(max daily number of activities + 1) |
| daily_attempts_90_max | The ratio of 90 percentile daily attempts (the minimum value of daily attempts necessary for a client to be in the top 10 percent of clients with the highest number of daily attempts) to max daily attempts in a client. An attempt may be a login, a purchase activity, an online application behavior, and the like. | daily_attempts_90_max = (90 percentile daily number of activities + 1)/(max daily number of activities + 1) |
| daily_attempts_99_max | The ratio of 99 percentile daily attempts (the minimum value of daily attempts necessary for a client to be in the top 1 percent of clients with the highest number of daily attempts) to max daily attempts in a client. An attempt may be a login, a purchase activity, an online application behavior, and the like. | daily_attempts_99_max = (99 percentile daily number of activities + 1)/(max daily number of activities + 1) |
| daily_attempts_skewness | The skewness of daily attempts distribution. An attempt may be a login, a purchase activity, an online application behavior, and the like. | daily_attempts_skewness = (3*(average daily number of activities − median daily number of activities) + 1)/(standard deviation of daily attempts + 1) |

Biometrics Behavior Features Table

| Groups of Features | Description of Groups of Features |
|---|---|
| etimeonpage_mean_max, etimeonpage_median_max, etimeonpage_skewness, etimeonpage_90_max, etimeonpage_99_max | These features are calculated based on a user's time spent on a page (when a user is interacting with a website). These feature values are calculated in a manner similar to the "daily_attempts_" features described in Traffic Pattern Features Table above. |
| wordsperminute_mean_max, wordsperminute_median_max, wordsperminute_skewness, wordsperminute_90_max, wordsperminute_99_max | These features are calculated based on words input by a user per minute when a user is interacting with a website. These feature values are calculated in a manner similar to the "daily_attempts_" features described in Traffic Pattern Features Table above. |
| etouchcount_mean_max, etouchcount_median_max, etouchcount_skewness, etouchcount_90_max, etouchcount_99_max | These features are calculated based on a number of screen touches received when a user is interacting with a website. These feature values are calculated in a manner similar to the "daily_attempts_" features described in Traffic Pattern Features Table above. |
| eclickcount_mean_max, eclickcount_median_max, eclickcount_skewness, eclickcount_90_max, | These features are calculated based on a number of mouse clicks received when a user is interacting with a website. |

-continued

| Biometrics Behavior Features Table | |
|---|---|
| Groups of Features | Description of Groups of Features |
| eclickcount_99_max | These feature values are calculated in a manner similar to the "daily_attempts_" features described in Traffic Pattern Features Table above. |
| estdev_mean_max, estdev_median_max, estdev_skewness, estdev_90_max, estdev_99_max | These features are calculated for the standard deviation of typing speed across users when users are submitting input to a website. These feature values are calculated in a manner similar to the "daily_attempts_" features described in Traffic Pattern Features Table above. |

| Geological Behavior Features Table | |
|---|---|
| Groups of Features | Description of Groups of Features |
| daily_ip_anomalous_mean_max, daily_ip_anomalous_median_max, daily_ip_anomalous_skewness, daily_ip_anomalous_90_max, daily_ip_anomalous_99_max | These features are calculated based on a number of anomalous IP addresses included in a day's worth of a client's data. These feature values are calculated in a manner similar to the "daily_attempts_" features described in Traffic Pattern Features Table above. |
| acct_zipcode_change_mean_max, acct_zipcode_change_median_max, acct_zipcode_change_skewness, acct_zipcode_change_90_max, acct_zipcode_change_99_max | These features are calculated based on a zipcode change frequency for each account included in a client's data. These feature values are calculated in a manner similar to the "daily_attempts_" features described in Traffic Pattern Features Table above. |
| acct_city_change_mean_max, acct_city_change_median_max, acct_city_change_skewness, acct_city_change_90_max, acct_city_change_99_max | These features are based on a city change frequency for each account in a client's data. These feature values are calculated in a manner similar to the "daily_attempts_" features described in Traffic Pattern Features Table above. |
| daily_abnormal_dist_mean_max, daily_abnormal_dist_median_max, daily_abnormal_dist_skewness, daily_abnormal_dist_90_max, daily_abnormal_dist_99_max | These features are calculated based on a daily number of abnormal distance changes in a client's data. For example, an abnormal distance change may be recorded when an account was logged into in Seattle, US less than a predetermined amount of time ago (for example, 5 minutes) and is now logging in from Shanghai, China. These feature values are calculated in a manner similar to the "daily_attempts_" features described in Traffic Pattern Features Table above. |

In some embodiments, the electronic processor 200 calculates a feature set for each client based on the features included in the above tables. In some embodiments, the electronic processor 200 then uses a Pearson Correlation, which is a statistical method used to calculate how strong two sets of data correlate to each other, to determine a similarity score associated with the first client 105 and another client included in the system 100. For example, a similarity score that the electronic processor 200 calculates for the first client 105 and the second client 110 may=

$$r_{XY} = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}}$$

where $X_i$ represents the feature set associated with the first client 105 and $Y_i$ represents the feature set associated with the first client 105. In this embodiment, the higher the similarity score is the greater the similarity between the first client 105 and the second client 110.

In other embodiments, the electronic processor 200 calculates a similarity score associated with the first client 105 and the second client 110 to be the abs(clientA_feature1−clientB_feature1)+ . . . +abs(clientA_featureN−clientB_featureN), wherein clientA is the first client 105 and clientB is the second client 110. In this embodiment, the higher the similarity score is the greater the similarity between the first client 105 and the second client 110. FIG. 4 illustrates an example table 400 of values calculated for a plurality of clients (for example, clients included in the system 100) when the electronic processor 200 executes the method 300. Column 405 of the table 400 includes similarity scores for each client that illustrates the similarity of the client to the first client 105.

At step 315, the electronic processor 200, for one or more signals, determines, for each of the one or more clients, a signal weight associated with the signal. For a client, each signal is assigned a signal weight (SWn) based on the frequency that the signal is observed to occur in the client. For example, in FIG. 4, Signal 1 for the second client 110 is heavily weighted ("13") relative to other clients and signals, thus indicating the second client 110 experiences a high frequency of Signal 1 occurring or being triggered relative to other clients. In some embodiments, when calculating the similarity score, the data collected for determining features such as those described above may be used. The columns 410, 415, and 420 included in the table 400 are each associated with a signal and each value included in columns 410, 415, and 420 is a signal weight determined for a client and signal pair.

At step 320, the electronic processor 200 multiplies the signal weight by the similarity score (associated with the same client as the signal weight) to generate a weighted similarity score associated with the signal and the client. In the table 400 performing the step 320 produces the values included in the columns 425, 430, and 435.

At step 325, the electronic processor 200, for each signal, generates a total weighted similarity score and a total similarity score. The total weighted similarity score is the summation of the weighted similarity scores generated for each client and a single signal. The total similarity score is the summation of the similarity scores generated for each client. In FIG. 4, the total weighted similarity scores are included in the row 440 labeled total. For example, the sum of the weighted similarity scores included in the column 425 for the second client through the sixth client is 26.08. The total similarity scores calculated for each signal are included in the row 445 included in FIG. 4. For example, 3.57 is the sum of the similarity scores included in the column 405.

In some embodiments, a client included in the system 100 may generally be similar to the first client 105 yet a particular signal may be missing from that client. An example of this is shown in FIG. 4, where Signal 2 is not observed in the data traffic of the third client 115. For that reason, there is no entry shown in the table 400 for the entry associated with column 415 and the third client 115 and the entry associated with column 430 and 415 and the third client 115. When a signal is not observed in a client, that client's similarity score and weighted signal score are not included in the total weighted similarity score and the total similarity score generated for that signal. For example, in FIG. 4, there was no significant frequency of Signal 2 in the third client 115, therefore 0.87 (the similarity score for the third client 115) is not part of the summation of similarity scores for Signal 2, yielding a total of 2.7 as shown in column 430 and row 445.

At step 330, the electronic processor 200, for each signal, generates a recommendation score based on the total weighted similarity score for the signal and the total similarity score for the signal (calculated at step 325). Thus, for Signal 1, the recommendation score is 26.08/3.57=7.3.

In some embodiments, the electronic processor 200 generates, based on the recommendation scores, one or more recommended signals for the first client. In the example illustrated in FIG. 4, the recommendation score for Signal 1 is higher than the recommendation scores for Signal 2 and Signal 3, and thus, Signal 1 is the signal that would be most highly recommended to the first client 105.

In some embodiments, before the electronic processor 200 recommends one or more signals, the electronic processor 200 determines a confidence associated with each recommendation score. In some embodiments, the electronic processor 200 uses min-max normalization to determine a confidence associated with each signal. Therefore, confidence=(recommendation score−minimum recommendation score)/(maximum recommendation score−minimum recommendation score). The maximum and minimum recommendation scores are the minimum and maximization recommendation scores calculated from amongst the recommendation scores calculated for each signal. For example, in FIG. 4 for Signal 3, the confidence=(5.9−5.6)/(7.3−5.6)=0.3/1.7=0.176 (17.6%). In some embodiments, the electronic processor 200 recommends one or more signals based on the confidences associated with the signals. For example, a signal associated with a confidence of 71% will be recommended above a signal associated with a confidence of 61%.

In some embodiments, the recommend signals are a predetermined number of signals associated with the highest calculated confidences (for example, the 10 signals with the highest confidences). In other embodiments, the recommended signals are each signal with a confidence above a predetermined threshold (for example, each signal with a confidence above 50 percent may be recommended). In some embodiments, the generated signal recommendations are sent to one or more electronic devices associated with the first client 105. In some embodiments, the recommended signals sent to the one or more electronic devices associated with the first client 105 are ranked based on their confidences. In some embodiments, the confidences associated with the recommended signals are sent to the one or more electronic devices associated with the first client 105.

In some embodiments, rather than or in addition to sending the generated signal recommendations to one or more electronic devices associated with the first client 105, the fraud prevention application is automatically configured to monitor, for the first client 105, the signals associated with recommendation scores having confidences above a predetermined threshold.

Figure 5:
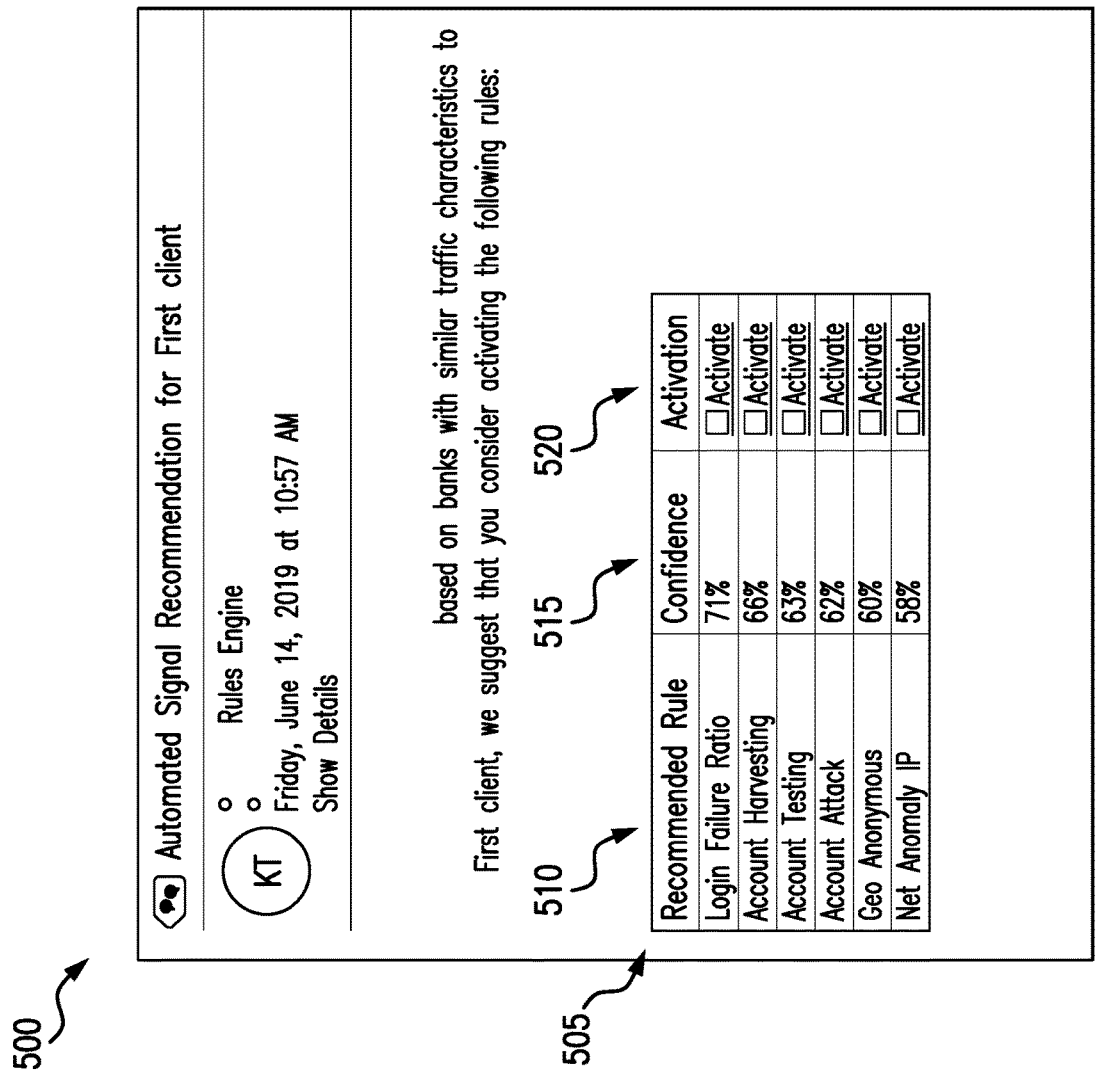
FIG. 5 is an example message including a signal recommendation according to some embodiments.

FIG. 5 is an example message 500 sent from the server 120 to an electronic device associated with the first client 105. The message 500 includes a table 505 including a list of signal recommendations 510. The confidences for each of the recommended signals are included in the column 515. The column 520 includes an activation link for each recommended signal. When an activation link is selected, the fraud prevention application monitors the recommended signal associated with the selected activation link.

It should be understood that the three signals included in the table 400 are merely illustrative and that, in some embodiments, hundreds or thousands of signals may be analyzed when the method 300 is performed by the electronic processor 200. In some embodiments, before signal recommendations are sent to one or more electronic devices associated with the first client, a user (for example, an expert in cybersecurity) may review and modify the signal recommendations.

In some embodiments, the electronic processor 200 predicts whether an attack is taking place and the type of attack taking place based on the signals (a combination of signals) that have been triggered for a client. The electronic processor 200 predicts the type of attack occurring based on signals that are triggered by applying an frequent pattern mining algorithm (for example, a frequent pattern growth (FP-growth) algorithm) to records stored for clients included in the system 100. The records stored for the clients included in the system 100 include a type of attack that occurred and the signals that were triggered at the time of the attack.

Figure 6:
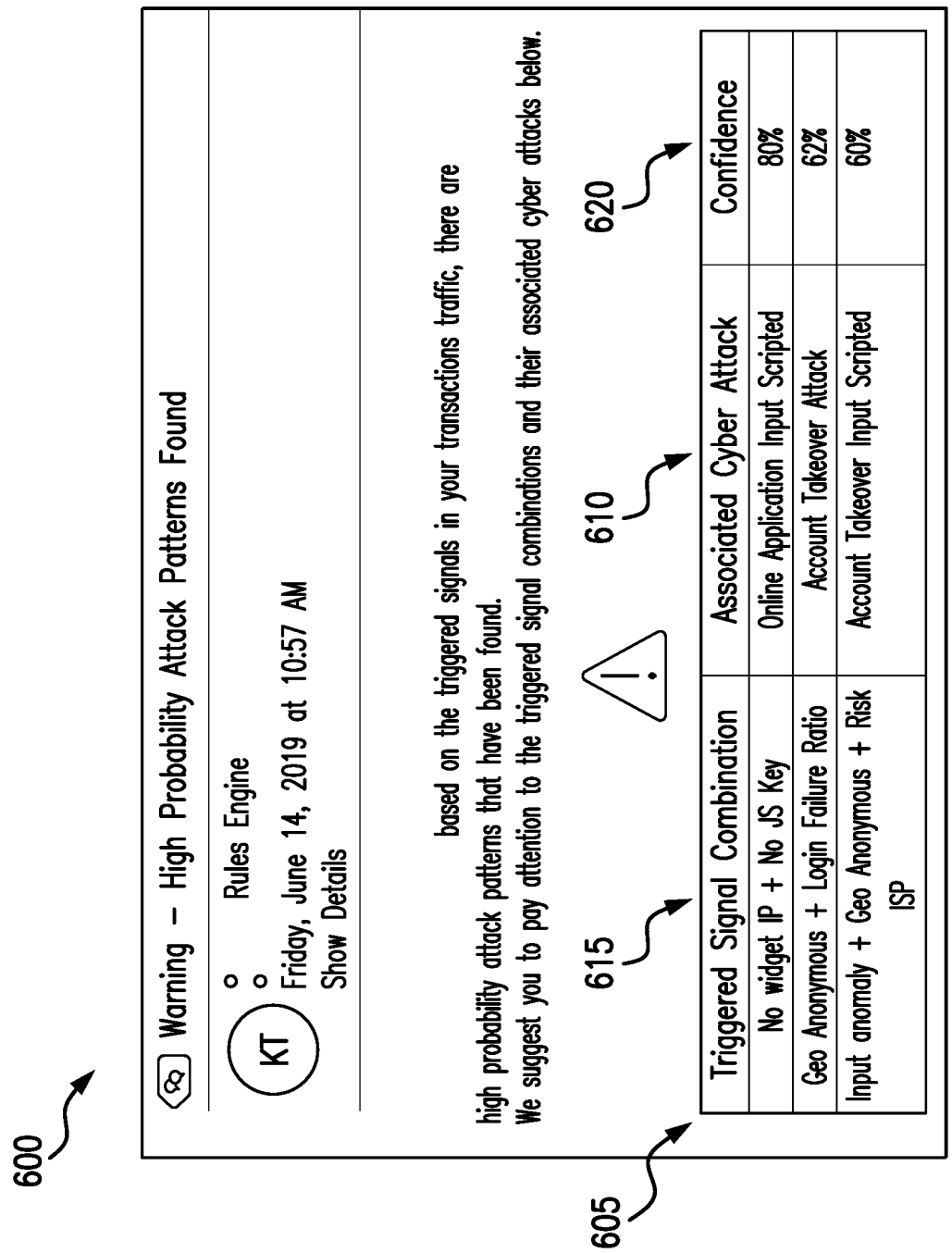
FIG. 6 is an example message including predicted types of attacks according to some embodiments.

FIG. 6 illustrates an example message 600 that is sent from the server 120 to an electronic device associated with a client and includes a table 605 of types of attacks predicted to be occurring against the client. In the table 605, the predicted types of attacks are included in column 610, the signals that the prediction of the type of attack is based on is included in column 615, and confidences associated with predicted types of attacks are included in column 620. For example, in FIG. 6, when the signals "No widget IP" and "No JS(Javascript™) key" are triggered, the electronic processor 200 determines that there is 80% probability that an ATO attack is occurring.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for recommending signals to monitor in a fraud prevention application, the system comprising
a server including an electronic processor, the electronic processor configured to
receive a request for signal recommendations for a first client;
calculate a similarity score for one or more clients different from the first client;
for one or more signals, determine, for each of the one or more clients, a signal weight associated with the signal;
multiply the signal weight by the similarity score associated with the client to generate a weighted similarity score associated with the signal and the client;
generate a total similarity score and, for each signal, a total weighted similarity score;
for each signal, generate a recommendation score based on the total weighted similarity score for the signal and the total similarity score for the signal; and
based on the recommendation scores, generate one or more recommended signals for the first client.

2. The system according to claim 1, wherein the electronic processor is configured to
calculate a confidence for each recommendation score; and
send the confidence associated with the generated one or more recommended signals to an electronic device associated with the first client.

3. The system according to claim 2, wherein the electronic processor is configured to send a list of the one or more recommended signals to an electronic device associated with the first client, wherein the recommended signals are ranked based on their confidences.

4. The system according to claim 2, wherein electronic processor is configured to calculate a confidence for each recommendation score using a minimum recommendation score calculated in claim 1 and a maximum recommendation score calculated in claim 1.

5. The system according to claim 2, wherein the electronic processor is configured to automatically configure the fraud prevention application to monitor, for the first client, a signal associated with a recommendation score having a confidence above a predetermined threshold.

6. The system according to claim 1, wherein the similarity score represents the similarity between the first client and a client included in the one or more clients and is calculated based on one or more features selected from at least one of the group comprising traffic pattern features, biometrics behavior features, and geological behavior features.

7. The system according to claim 1, wherein the electronic processor is configured to calculate a similarity score for one or more clients different from the first client by using a Pearson Correlation.

8. The system according to claim 1, wherein electronic processor is further configured to
determine whether a combination of triggered signals is indicative of an attack.

9. A method for recommending signals to monitor in a fraud prevention application, the method comprising
receiving a request for signal recommendations for a first client;
calculating a similarity score for one or more clients different from the first client;
for one or more signals, determining, for each of the one or more clients, a signal weight associated with the signal;
multiplying the signal weight by the similarity score associated with the client to generate a weighted similarity score associated with the signal and the client;
generating a total similarity score and, for each signal, a total weighted similarity score;
for each signal, generating a recommendation score based on the total weighted similarity score for the signal and the total similarity score for the signal; and
based on the recommendation scores, generating one or more recommended signals for the first client.

10. The method according to claim 9, the method further comprising
calculating a confidence for each recommendation score; and
sending the confidence associated with the generated one or more recommended signals to an electronic device associated with the first client.

11. The method according to claim 10, the method further comprising
sending a list of the one or more recommended signals to an electronic device associated with the first client, wherein the recommended signals are ranked based on their confidences.

12. The method according to claim 10, wherein calculating a confidence for each recommendation score includes using a minimum recommendation score calculated in claim 8 and a maximum recommendation score calculated in claim 8.

13. The method according to claim 9, wherein the signal weight represents a frequency with which the signal is triggered and is calculated based on one or more features selected from at least one of the group comprising traffic pattern features, biometrics behavior features, and geological behavior features.

14. The method according to claim 9, wherein calculating a similarity score for one or more clients different from the first client includes using a Pearson Correlation.

15. The method according to claim 9, the method further comprising
determining whether a combination of triggered signals is indicative of an attack.

16. The method according to claim 9, wherein the total weighted similarity score is a summation of the weighted similarity scores generated for each client and a single signal and the total similarity score is a summation of the similarity scores generated for each client.

17. A non-transitory computer-readable medium with computer-executable instructions stored thereon executed by an electronic processor included in a server to perform the method of recommending signals to monitor in a fraud prevention application, comprising
- receiving a request for signal recommendations for a first client;
- calculating a similarity score for one or more clients different from the first client;
- for one or more signals, determining, for each of the one or more clients, a signal weight associated with the signal;
  - multiplying the signal weight by the similarity score associated with the client to generate a weighted similarity score associated with the signal and the client;
- generating a total similarity score and, for each signal, a total weighted similarity score;
- for each signal, generating a recommendation score based on the total weighted similarity score for the signal and the total similarity score for the signal; and
- based on the recommendation scores, generating one or more recommended signals for the first client.

18. The non-transitory computer-readable medium according to claim 17, wherein the signal weight represents a frequency with which the signal is triggered and is calculated based on one or more features selected from at least one of the group comprising traffic pattern features, biometrics behavior features, and geological behavior features.

19. The non-transitory computer-readable medium according to claim 17, the method further comprising
- determining whether a combination of triggered signals is indicative of an attack.

20. The non-transitory computer-readable medium according to claim 17, the method further comprising
- calculating a confidence for each recommendation score; and
- sending the confidence associated with the generated one or more recommended signals to an electronic device associated with the first client.

* * * * *